(12) United States Patent
Matsuo et al.

(10) Patent No.: US 7,849,818 B2
(45) Date of Patent: Dec. 14, 2010

(54) ANIMAL LITTER BOX

(75) Inventors: Takayuki Matsuo, Tokyo (JP); Takeshi Ikegami, Tokyo (JP); Kenji Hiroshima, Tokyo (JP)

(73) Assignee: Uni-Charm Corporation, Ehime (JP)

( * ) Notice: Subject to any disclaimer, the term of this patent is extended or adjusted under 35 U.S.C. 154(b) by 58 days.

(21) Appl. No.: 12/145,945

(22) Filed: Jun. 25, 2008

(65) Prior Publication Data

US 2009/0000556 A1    Jan. 1, 2009

(30) Foreign Application Priority Data

Jun. 29, 2007  (JP) .............................. 2007-173552

(51) Int. Cl.
  *A01K 1/035*  (2006.01)
(52) U.S. Cl. ...................... 119/166; 119/165
(58) Field of Classification Search .............. 119/165, 119/166, 167, 168, 170, 161–164, 169, 867, 119/869
  See application file for complete search history.

(56) References Cited

U.S. PATENT DOCUMENTS

| | | | | |
|---|---|---|---|---|
| 2,736,452 A | * | 2/1956 | Roop ........................ | 220/4.21 |
| 4,096,827 A | | 6/1978 | Cotter | |
| 4,303,172 A | * | 12/1981 | Bosland ..................... | 220/252 |
| 4,696,257 A | * | 9/1987 | Neary et al. ................ | 119/166 |
| D300,968 S | * | 5/1989 | Conner ...................... | D30/161 |
| 5,259,340 A | | 11/1993 | Arbogast | |
| 5,515,812 A | * | 5/1996 | Faust ........................ | 119/166 |
| 5,522,347 A | * | 6/1996 | Merino ...................... | 119/165 |
| 5,564,364 A | | 10/1996 | Kovacs et al. | |
| 5,572,950 A | * | 11/1996 | O'Rourke et al. ........... | 119/165 |
| 5,623,892 A | * | 4/1997 | O'Rourke et al. ........... | 119/165 |
| 5,655,478 A | * | 8/1997 | Kiera ........................ | 119/165 |
| 5,673,648 A | | 10/1997 | Ayle | |
| 5,806,461 A | * | 9/1998 | Kiera ........................ | 119/165 |
| D399,613 S | * | 10/1998 | O'Rourke et al. .......... | D30/161 |

(Continued)

FOREIGN PATENT DOCUMENTS

JP      S61197953 U     12/1986

(Continued)

OTHER PUBLICATIONS

Official Action mailed Oct. 14, 2009 in U.S. Appl. No. 12/117,370.

*Primary Examiner*—Rob Swiatek
*Assistant Examiner*—Ebony Evans
(74) *Attorney, Agent, or Firm*—Brinks Hofer Gilson & Lione

(57) ABSTRACT

To provide an animal litter box that is easy to clean and whose setup space is not large. An animal litter box equipped with an excreta container; a lower container; and a hood, the hood has a fixed hood at a backside; a movable hood disposed at a front side; and a pair of linking portions. The movable hood is formed with an opening. When the movable hood is changed from a closed state to an opened state, the protruding height T3 that is the difference of the height T1 of the highest portion in the track of movement of the movable hood and the height T2 of the highest portion of the animal litter box when the movable hood is in a closed state is lower than the height T4 of the movable hood.

5 Claims, 14 Drawing Sheets

U.S. PATENT DOCUMENTS

| | | | |
|---|---|---|---|
| 6,202,595 B1 | 3/2001 | Atcravi | |
| 6,295,949 B1 | 10/2001 | Willis | |
| 6,494,165 B2 * | 12/2002 | Asbury | 119/166 |
| 6,848,394 B1 * | 2/2005 | Sexton | 119/170 |
| 6,892,670 B2 * | 5/2005 | Northrop et al. | 119/166 |
| 2004/0129230 A1 * | 7/2004 | Northrop et al. | 119/165 |
| 2004/0261727 A1 * | 12/2004 | Matsuo et al. | 119/170 |
| 2005/0211179 A1 * | 9/2005 | Lewis | 119/168 |
| 2006/0005777 A1 | 1/2006 | Galindo et al. | |

FOREIGN PATENT DOCUMENTS

| | | |
|---|---|---|
| JP | 01-61052 | 4/1989 |
| JP | H0161052 U | 4/1989 |
| JP | 3000193 U | 8/1994 |
| JP | 0826350 | 1/1996 |
| JP | 3069100 | 3/2000 |
| JP | 2002-325520 | 11/2002 |
| JP | 2004121147 | 4/2004 |
| JP | 2005006605 | 1/2005 |
| JP | 3114072 | 8/2005 |
| JP | 3115333 | 9/2005 |
| JP | 2006101890 | 4/2006 |
| JP | 2007000124 | 1/2007 |
| JP | 2007159591 | 6/2007 |

\* cited by examiner

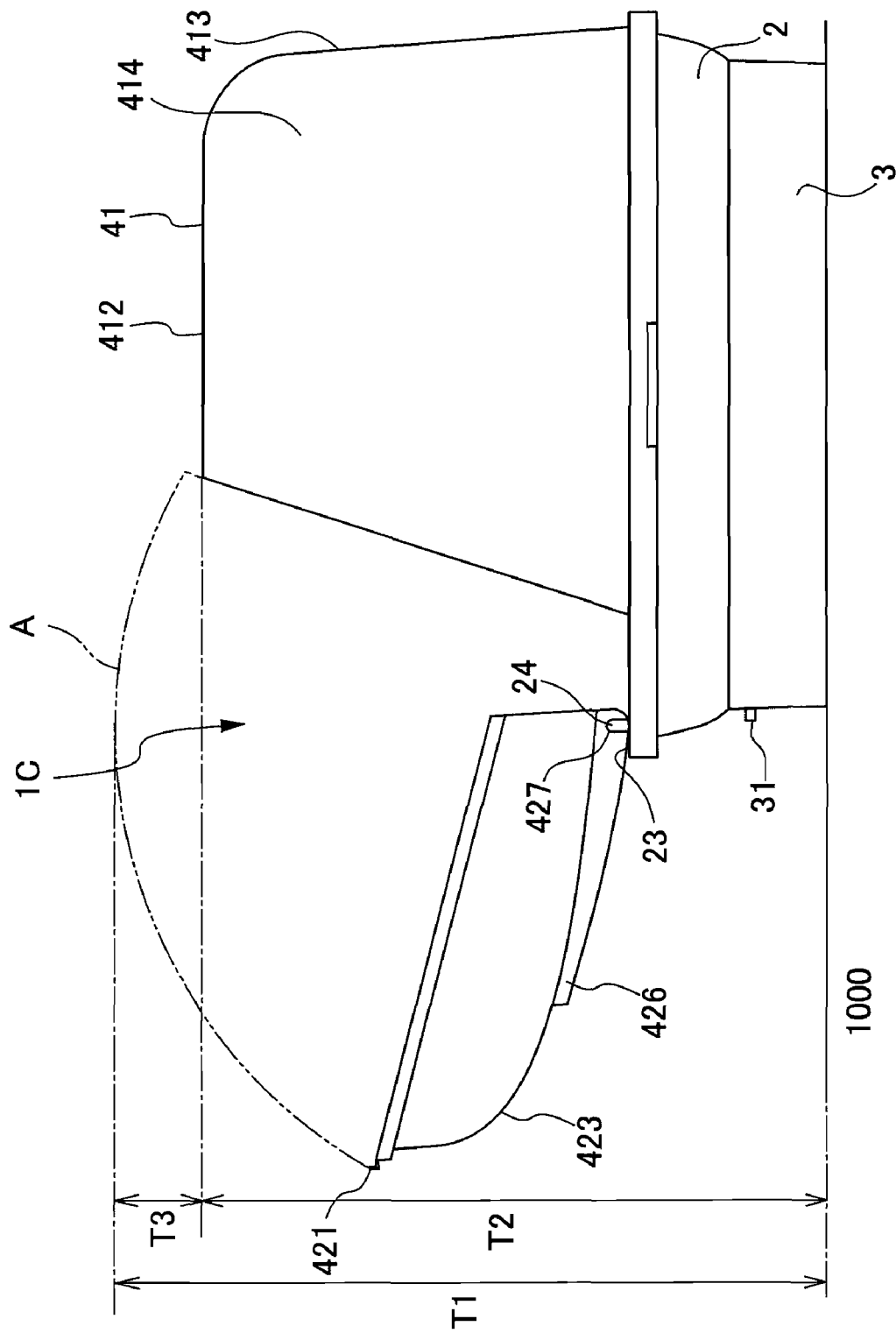

ANIMAL LITTER BOX

This application is based on and claims the benefit of priority from Japanese Patent Application No. 2007-173552, filed on Jun. 29, 2007, the content of which is incorporated herein by reference.

BACKGROUND OF THE INVENTION

1. Field of the Invention

The present invention relates to a toilet for animals.

2. Related Art

Conventionally, an animal litter box that can be setup indoors has been used to handle excreta from animals kept indoors as pets. In recent years, an animal litter box has been developed that uses a double structure of an excreta container that houses litter to cover or harden fecal matter and a lower container disposed therebelow equipped with a tray that houses an absorbent sheet to absorb urine that passes through the litter, and is equipped with a hood that covers these containers.

Dogs and cats kept indoors as pets have an instinct to dig a hole after excreting, and a behavior of stirring litter laid down in the animal litter box. Therefore, having the aforementioned hood prevents litter soiled with fecal matter from being scattered about indoors. However, when removing fecal matter covered by the litter or cleaning the entire toilet of an animal litter box equipped a hood, there are the problems of having to insert a hand through the entrance provided in the hood of the animal litter box, or having to remove the hood altogether.

To solve those problems, an animal litter box was developed that has a rotatable hood installed on the excreta container that can be moved to open by rotating the hood. (See Japanese Unexamined Patent Application Publication No. 2004-121147, herein after referred to as Patent Document 1) The animal litter box described in Patent Document 1 has a large opening formed so that cleaning is easy without having to remove the hood.

However, it is necessary for a toilet equipped with a hood to be of a size large enough to ensure space therein for the animal to excrete. Furthermore, the hood described in Patent Document 1 requires adequate space above when the hood is opened. In addition to the space taken up by the toilet, space in a height direction is also necessary after the hood is moved. There is a problem in that locations where an animal litter box equipped with a rotatable hood is setup, as in Patent Document 1, require a wider space in the height direction than those that do not rotate.

In living environments where surface area is limited, such as in condominiums and the like, there is not always a wide space to spare for setting up an animal litter box. For that reason, an animal litter box is needed that can be setup in a space that is of the same degree as conventional toilet spaces, and that is easy to clean even if the hood is rotatable.

SUMMARY OF THE INVENTION

Therefore, an object of the present invention is to provide an animal litter box that makes it easy to remove or to clean away fecal matter, and whose setup space is not large even when the hood is opened.

(1) An animal litter box including: an excreta container having a liquid-permeable bottom portion; and an open top portion; a lower container positioned below the excreta container, having a drawable tray that collects liquid that passed through the bottom portion and an insertion inlet to insert the draw tray; and a hood disposed to cover the opening of the excreta container, wherein the hood includes: a fixed hood disposed at a backside that is one end of the excreta container; a movable hood disposed at a front side that is an opposite side to the backside of the excreta container, and a pair of linking portions that rotatably links the movable hood;

in which the movable hood is formed with an opening that connects an inner space of the animal litter box to an outside space;

the opening and the insertion inlet are disposed at the front side;

when the movable hood is open, the front side at the opening is exposed, and the bottom portion is exposed; and when the movable hood is changed from a closed state to an opened state, a protruding height that is a difference of a height of the highest portion in the track of the movable hood movement and a height of the highest portion of the animal litter box when the movable hood is closed is lower than the height of the movable hood.

(2) The animal litter box according to the first aspect of the present invention, in which the protruding height is not greater than 250 mm.

(3) The animal litter box according to the first or second aspects of the present invention, in which a hood side handle portion is formed in the movable hood to open and close the movable hood, and a tray side handle portion is formed in the draw tray to draw the draw tray; and when the movable hood is closed, the tray side handle portion and the hood side handle portion are mutually adjacent at the front side.

(4) The animal litter box according to any one of the first through the third aspects of the present invention, in which the movable hood and the fixed hood have a portion that overlaps when the movable hood is closed, and a pair of linking portions links the movable hood to the fixed hood at a portion of the overlapping portion;

the movable hood rotates at a position outside of the fixed hood when the movable hood is changed from a closed state to an opened state; and when the movable hood is in an opened state, the movable hood is positioned to cover the outside of the fixed hood.

(5) The animal litter box according to the fourth aspect of the present invention, in which the pair of linking portions is equipped to be mutually opposed near edges of the lower container side at the overlapping portion.

(6) The animal litter box according to the first through the third aspects of the present invention, in which the movable hood and the fixed hood have a portion that overlaps when the movable hood is closed, and the pair of linking portion links the movable hood to the fixed hood at a portion of the overlapping portion, the pair of linking portions includes: a pair of projecting shafts that projects from both outside surfaces, formed at an upper side of both outside surfaces of the movable hood at the overlapping portions;

a pair of cavities formed at an upper side of both inside surfaces of the fixed hood at the overlapping portions that engage the pair of projecting shafts; and a guide channel extending in a substantially horizontal direction toward the backside being continuously formed at each of the pair of cavities; and when the movable hood is changed from a closed state to an opened state, the movable hood is rotated substantially 90 degrees so that the hood side handle portion moves to a top side, and when the movable hood is rotated, the projecting portion moves substantially horizontally guided by the guide channel so that the movable hood is housed inside the fixed hood.

(7) The animal litter box according to the first through the third aspects of the present invention, in which the movable hood and the fixed hood have a portion that overlaps when the movable hood is closed, and the pair of linking portion links the movable hood to the fixed hood at a portion of the overlapping portion, the pair of linking portions includes: a pair of projecting shafts that projects from both inside surfaces, formed at an upper side of both inside surfaces of the fixed hood at the overlapping portions;

and a pair of cavities formed at an upper side of both outside surfaces of the movable hood at the overlapping portions that engage the pair of projecting shafts;

a guide channel extending in a substantially vertical direction toward the bottom side of the movable hood when the movable hood is in a closed state, being continuously formed at each of the pair of cavities; and when the movable hood is changed from a closed state to an opened state, the movable hood is rotated substantially 90 degrees so that the hood side handle portion moves to a top side, and when the movable hood is rotated, the projecting portion moves substantially horizontally guided by the guide channel so that the movable hood is housed inside the fixed hood.

(8) The animal litter box according to any one of the third through the fifth aspects of the present invention, in which the movable hood and the fixed hood have a portion that overlaps when the movable hood is closed, and the pair of linking portion links the movable hood to the fixed hood at a portion of the overlapping portion, the pair of linking portions includes: a pair of projecting shafts that projects from outside surfaces at a pair of support portions formed to extend from a top in the side edge of the backside of the movable hood to the backside; and a pair of cavities formed in inside surfaces in a pair of long convex guide portions formed at top surface side of the fixed hood, equipped to extend from the front side to the backside;

a guide channel that extending in a substantially horizontal direction toward the backside are formed at each of the pair of cavities; and when the movable hood is changed from a closed state to an opened state, the movable hood is rotated substantially 90 degrees so that the hood side handle portion moves to a top side, and when the movable hood is rotated, the movable hood is disposed to be set at a top surface of the fixed hood by the projecting shaft moving substantially horizontally being guided by the guide channel.

(9) The animal litter box according to the first or the second aspects of the present invention, in which the pair of linking portions includes: a pair of linking shafts provided at top edges of the front side of the excreta container, and a pair of bearings that supports the pair of linking shafts, provided near both side edges of the opening in the bottom edge portion of the front side of the movable hood, to link the movable hood to the excreta container; wherein when the movable hood is changed from a closed state to an opened state, the movable hood is rotated substantially 90 degrees so that the top edge of the movable hood moves to a bottom side.

The present invention provides an animal litter box that makes it easy to remove and to clean away fecal matter, and whose setup space is not large even when the hood is opened.

BRIEF DESCRIPTION OF THE DRAWINGS

FIG. 14 is a side view showing a movable hood on the animal litter box according to the fourth embodiment, in a state in which it is rotated downward.

DETAILED DESCRIPTION OF THE INVENTION

The following will now explain preferred embodiments of the present invention with reference to the drawings provided. It should be noted that the present invention is in no way limited to the embodiments below, nor is the technical range limited to the embodiments.

1. First Embodiment

The following will now explain the overall structure of the animal litter box 1 of the present invention using the animal litter box 1 of the first embodiment.

Figure 1:
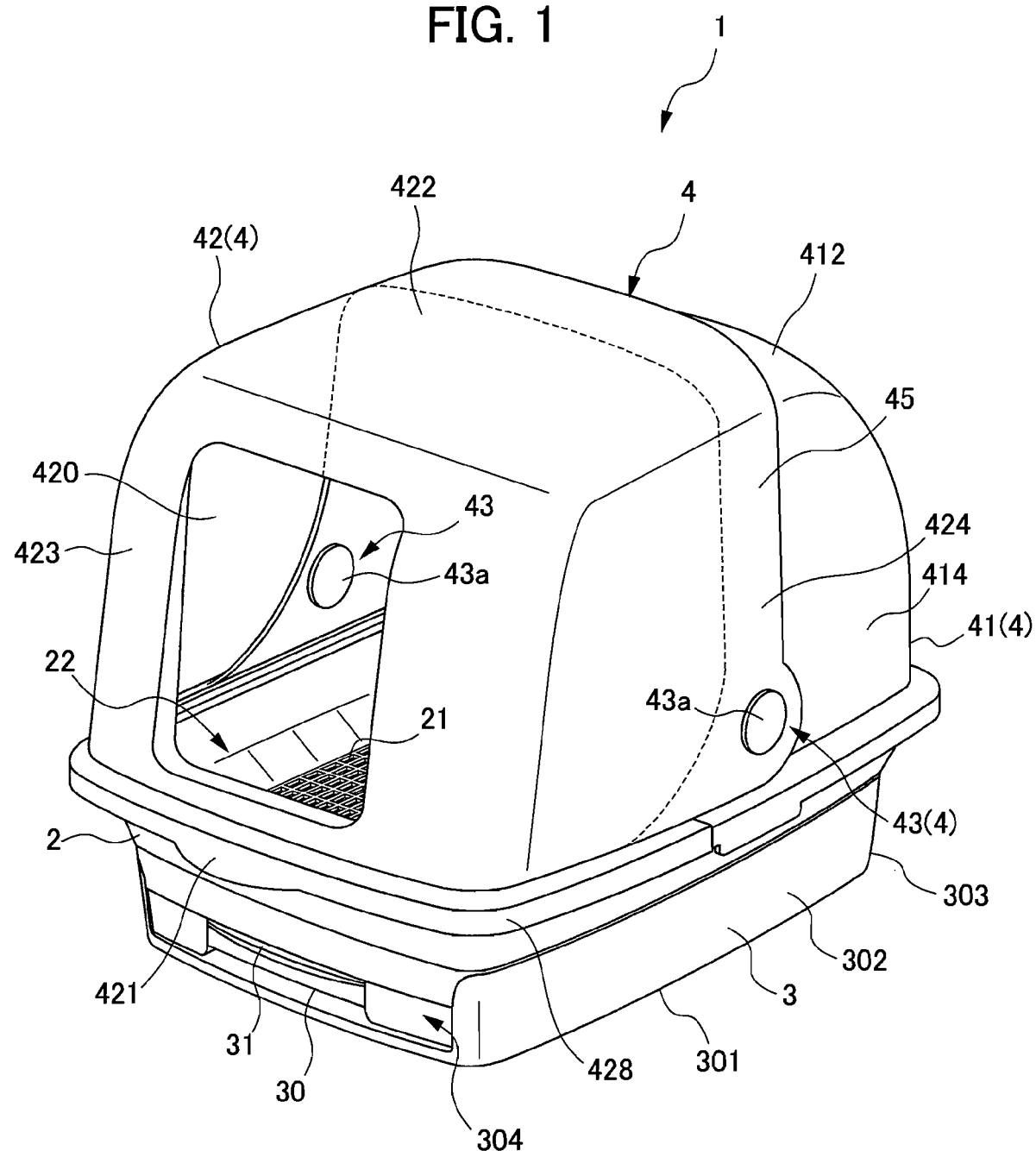
FIG. 1 is a perspective view of a closed state of the animal litter box according to a first embodiment.

FIG. 1 is a perspective view showing the movable hood on the animal litter box according to a first embodiment, in a closed state. As shown in FIG. 1, the animal litter box 1 according to the first embodiment has a liquid-permeable bottom portion 21; an excreta container 2 a top portion thereof being open; a lower container 3 positioned under the excreta container 2, having a draw tray 30 that can be drawn in a horizontal direction; and a hood 4 disposed to cover an opening 22 of the excreta container 2 above the excreta container 2.

As shown in FIG. 1, the hood 4 has a movable hood 42 and fixed hood 41. The fixed hood 41 is disposed at a backside of an edge of the excreta container 2. In these specifications, the side where the fixed hood 41 is disposed on the animal litter box 1 is called the backside; the side opposite the backside is called the front side. The movable hood 42 is disposed at the front side of the excreta container 2. An opening 420 that connects the inside space of the animal litter box 1 and the outside space to allow an animal to enter and exit, and a hood side handle portion 421 used when opening and closing the movable hood 42 are formed at the front side of the movable hood 42.

The fixed hood 41 and movable hood 42 have an overlapping portion 45. A pair of linking portions 43 that rotatably connects the movable hood 42 to the fixed hood 41 is disposed in this overlapping portion 45.

FIG. 1 shows a state where the movable hood 42 is closed. In the closed state, the opening 420 in the movable hood and the hood side handle portion 421 are disposed to be mutually adjacent at the front side.

Figure 2:
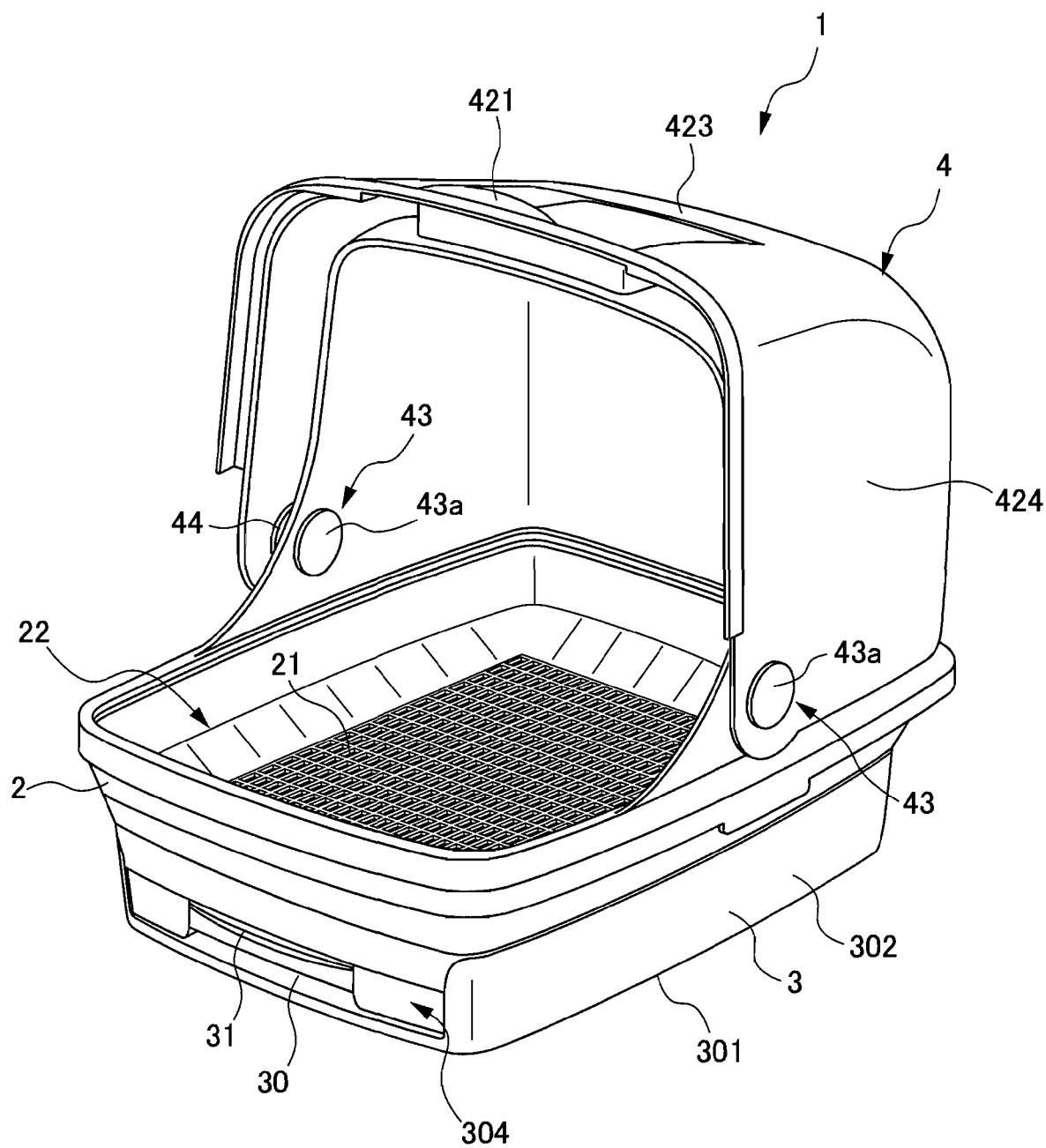
FIG. 2 is a perspective view of an opened state of the animal litter box according to the first embodiment.

FIG. 2 is a perspective view showing the movable hood on the animal litter box according to the first embodiment, in an opened state. FIG. 2 shows an opened state, where the movable hood 42 has been moved. In the opened state, the front side of the opening 22 of a top portion of the excreta container 2 is exposed, and the front side of the bottom portion 21 of the excreta container 2 is exposed from the opening 22.

Figure 3:
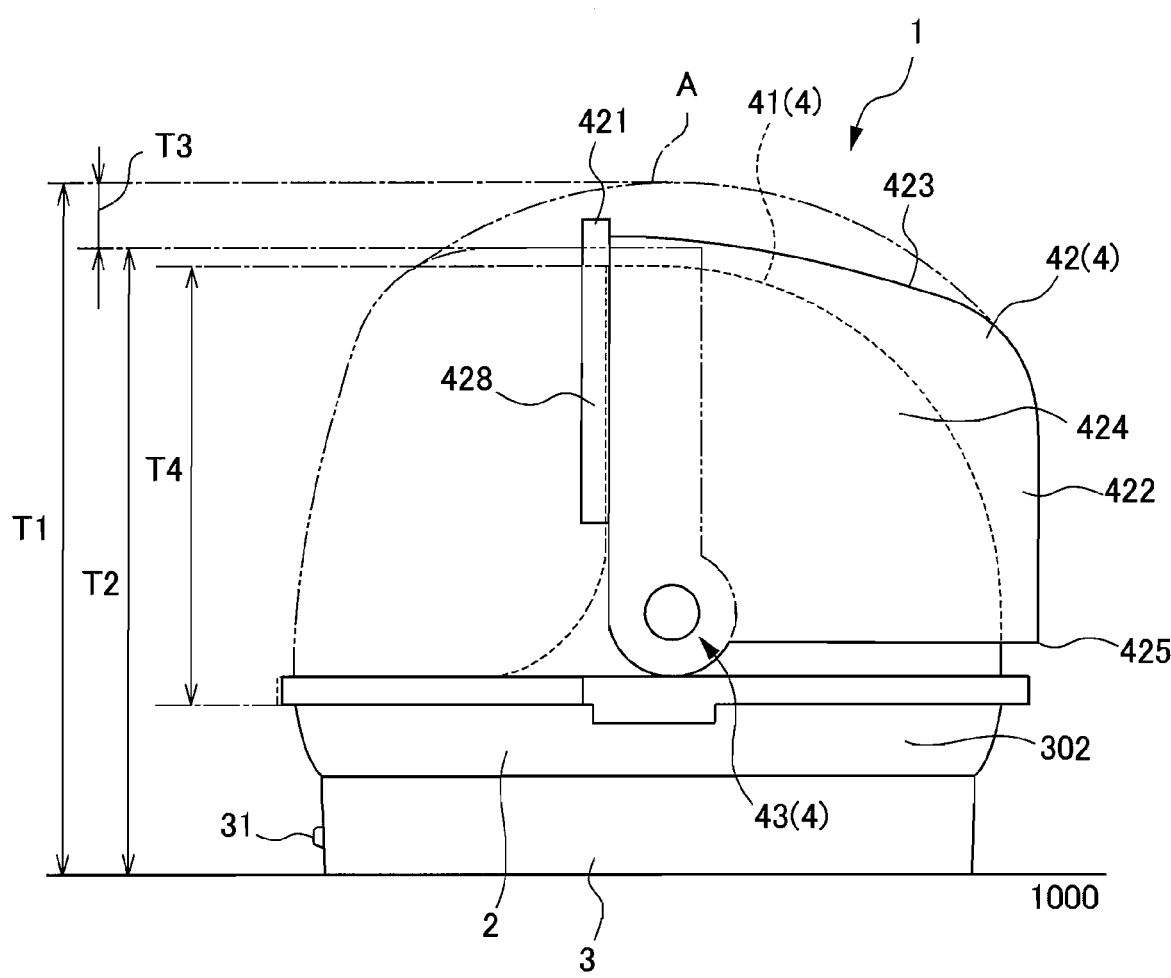
FIG. 3 is a side view to explain a state to open a hood of the animal litter box according to the first embodiment.

FIG. 3 is a side view showing the movable hood on the animal litter box according to the first embodiment, while being opened. FIG. 3 is a side view of the animal litter box 1 in the opened state. This drawing shows the change from the closed state to the opened state. T4 denotes the height in a vertical direction of the movable hood 42 in the closed state of the movable hood 42. The height T4 of the movable hood 42 is the length in the vertical direction from the portion of the movable hood 42 most positioned at the excreta container 2 side when the hood is closed to the portion positioned at the highest of the top surface of the movable hood 42.

The height T2 of the highest portion of the animal litter box 1 when the movable hood 42 is closed, is the height from the setting surface 1000 to the highest portion in the vertical direction of the animal litter box 1 when closed.

When the movable hood is changed from a closed state to an opened state, the difference between the highest point T1 in the track of the region for the movable hood 42 to move and the height T2 of the animal litter box 1 in its closed state is the protruding height T3.

In this embodiment, the protruding height T3 is configured to be lower than the height T4 of the movable hood 42. Specifically, the protruding height T3 is preferred to be not greater than 250 mm, more preferably not greater than 150 mm, and most preferably not greater than 100 mm.

As shown in FIG. 2, the excreta container 2 has the bottom portion 21 formed with crosspieces in a pallet shape, the crosspieces formed at regularly spaced gaps. Wall surfaces of the excreta container 2 are formed to rise upward in a vertical direction from the periphery of the bottom portion 21. Particulate matter called litter that absorbs or passes liquid such as urine can be spread in the excreta container 2. Litter is molded from bentonite or paper that absorbs liquid, or zeolite or silica gel provided with deodorizing power into substantially spherical shapes a diameter thereof on the order of several mm to several cm. Conventionally known litter can be used.

The shape of the flat surface of the excreta container 2 is substantially a rectangle in this embodiment; the four corners are formed to a curved line. The excreta container 2 has wall surfaces in four directions of both side edges of the longitudinal direction and both side edges of the lateral direction. The excreta container 2 may have any shape for the flat surface such as a square or oval and the like is acceptable as long as the excreta container 2 can house litter. Excreta excreted by an animal passes through the litter, and the gaps formed by the pallet-shaped crosspieces to fall into the lower container 3 disposed below the excreta container 2. The excreta container 2 is manufactured using resin such as plastic and the like, but that is not to be construed as any particular limitation.

The lower container 3 is equipped with a draw tray 30 that has a frame-shape (an opening) at the upper surface opening and can be slidably drawn in the lower container 3. The lower container 3 has a lower container bottom surface 301 that opposes the setting surface 1000 where the animal litter box 1 is set. Also, the lower container 3 has an opening of the upper surface that corresponds to a shape of the bottom portion 21 of the excreta container 2 so that it can mate with the excreta container 2 disposed above, and a front side wall surface 302 that rises from both side edges of the longitudinal direction, and a backside wall surface 303 that rises from a backside edge. The front of the lower container 3 has an opening 304 to draw out the draw tray 30. Note that in this embodiment, the bottom portion of the lower container 3 is formed by a plane, but the shape and configuration is not particular limited thereto if the lower container 3 slidably holds the draw tray 30.

A tray side handle portion 31 is formed on the draw tray 30 that a user can use to draw the tray toward the front side. The draw tray 30 is open at the upper surface, and has a bottom surface; an absorbent sheet that absorbs urine that passed through the pallet-shaped bottom portion 21 of the excreta container 2 is laid on this bottom surface. The draw tray 30 is formed to dimensions that are smaller all around than the lower container 3 to correspond to the lower container 3 to slide and be stored in the lower container 3. The draw tray 30 is equipped with wall surfaces in four direction, including a surface formed with the tray side handle portion 31. The draw tray 30 is drawn in a horizontal direction in this embodiment, but this is not a limitation. For example, it is also acceptable to draw the drawer obliquely upward.

The hood 4 is equipped with the movable hood 42 and the fixed hood 41, and the pair of linking portions 43 formed in portions where the movable hood 42 and fixed hood 41 overlap. The movable hood 42 is rotatably linked to the fixed hood 41 at the linking portions 43. Also, the hood 4 has a hood side handle portion 421 that the user grips by hand to move the movable hood 42.

The movable hood 42 is disposed at the front side of the substantially rectangular excreta container 2, in this embodiment. When closed, an opening 420 that is an entrance and exit for an animal to enter is formed in the front surface 423 on the front side of the movable hood 42. The movable hood 42 also has a movable hood top surface 422 substantially orthogonal to the front surface 423, positioned upward when the movable hood 42 is closed; and movable hood longitudinal direction side surfaces 424 of the movable hood 42 that compose both side surfaces of the longitudinal direction of the animal litter box 1.

In this embodiment, a bottom edge 428 is formed from the hood side handle portion 421 of the movable hood 42 to the longitudinal direction side surface 424 from the front surface 423 of the movable hood 42 along the outer circumference of the movable hood 42. The bottom edge 428 projects further to the outside of the animal litter box 1 than the outer circumference that extends from the front surface 423 of the movable hood to the longitudinal direction side surface 424. The bottom edge 428 covers the outer edge of the excreta container 2, and through this configuration, the movable hood 42 and excreta container 2 are fit together. Note that means for fitting the movable hood 42 and excreta container 2 are not limited to a bottom edge as long as the movable hood 42 covers the excreta container 2 without a gap, and the movable hood 42 and excreta container 2 are mated.

The fixed hood 41 is disposed at a backside of the substantially rectangular excreta container 2. The fixed hood 41 is formed to dimensions one size smaller than the movable hood 42 so the movable hood 42 rotates and moves over the outer surface of the fixed hood 41. The top surface 412 of the fixed hood 41 is formed to a substantially arced surface, that is a curved surface bent from an edge of the front side toward the backside edge. The fixed hood 41 has the fixed hood top surface 412, and the fixed hood longitudinal direction side surfaces 414 of the fixed hood 41 that compose both side surfaces of the longitudinal direction of the animal litter box 1.

The movable hood longitudinal direction side surfaces 424 and the fixed hood longitudinal direction side surfaces 414 mutually overlap. Also, the movable hood top surface 422 and the fixed hood top surface 412 mutually overlap. The pair of linking portions 43 is formed at the portion where the movable hood longitudinal direction side surfaces 424 and the fixed hood longitudinal direction side surfaces 414 mutually overlap. The linking portions 43 are disposed near the edges of the lower container 3 side at the portions where the longitudinal direction side surfaces 424, 414 overlap. The pair of linking portions is disposed to mutually oppose each other at the longitudinal direction side surface of one side and the longitudinal direction side surface of another side.

The linking portions 43 of the first embodiment are formed to link by fasteners at the portion 45 where the movable hood 42 and the fixed hood 41 overlap. The fasteners have a cylindrical shaft portion that penetrates the movable hood 42 and the fixed hood 41, and a flat holder portion 43a that holds the outer surface of the movable hood 42 and the inner surface of the fixed hood. The holder portions 43a are formed to be opposed at both sides of the shaft sandwiching the longitudinal direction side surfaces 424, 414 of the fixed hood 41 and the movable hood 42.

Note that the positioning of the overlapping portion 45 is not limited to that position. It is acceptable not to form the overlapping portions 45 if the fixed hood 41 and movable hood 42 can be linked. Also, the link of the movable hood is not limited to this embodiment. For example, it is acceptable if the movable hood 42 is rotatably linked to the excreta container 2.

In this embodiment, the hood side handle portion 421 of the movable hood, and the tray side handle portion 31 are adjacently disposed at the front side.

As shown in FIG. 3, by gripping and applying force to the hood side handle portion 421 formed on the front side, the movable hood 42 is rotated around the shafts of the linking portion fasteners as rotation shafts and the hood side handle portion 421 moves from the front side to the backside and is positioned above the animal litter box 1. When the movable hood 42 is moved, the edge 425 of the backside edge on the movable hood 42 is positioned at the backside of the animal litter box 1. At the same time, the bottom edge 428 of the movable hood 42, when closed, moves to be substantially perpendicular to the side wall portions 302 of the longitudinal direction of the excreta container 2.

The phantom line A shown in FIG. 3 indicates the track that the hood side handle portion 421 of the movable hood 42 moves. The movable hood 42 rotates around the shafts in the linking portions 43 and moves to cover the outside surface of the fixed hood 41. As described above, when the movable hood 42 changes from the closed state to the opened state, the protruding height T3 that is the difference of the highest portion T1 of the track of the movable hood 42 to move and the highest portion T2 of the animal litter box 1 when it is closed, is smaller than the height T4 of the movable hood 42 when the movable hood 42 is closed.

Therefore, by making the protruding height T3 smaller than the movable hood height T4, it is possible to setup the animal litter box 1 according to the present invention even in spaces where height is restricted. Also, to clean the inner space of the animal litter box 1, the front side of the bottom portion 21 of the excreta container 2 filled with litter is exposed simply by gripping and lifting the hood side handle portion 421 and moving the movable hood 42 to the backside. For that reason, it is possible to easily clean the entire inner space of the animal litter box 1 from the space of the widely opened front side.

Also, the hood side handle portion 421 of the movable hood, and the tray side handle portion 31 are adjacently disposed at the front side. In this way, because the hood side handle portion 421 and the tray side handle portion 31 are adjacent, it is possible to place a hand on the tray side handle portion 31 of the draw tray 30 soon after opening or closing the movable hood 42. Also, not only for cleaning the excreta container 2, but also work to replace the absorbent sheet laid in the draw tray 30 provided in the lower container 3 are possible by drawing the draw tray 30 open at the front side. Because the work to remove fecal matter, clean the litter, and inspect or replace the absorbent sheet is done at the front of the animal litter box 1, this work can be done easily. Also, with regard to space in a width direction to install the animal litter box 1, if a width to house the width of the animal litter box 1 can be ensure, that is sufficient.

2. Second Embodiment

Figure 4:
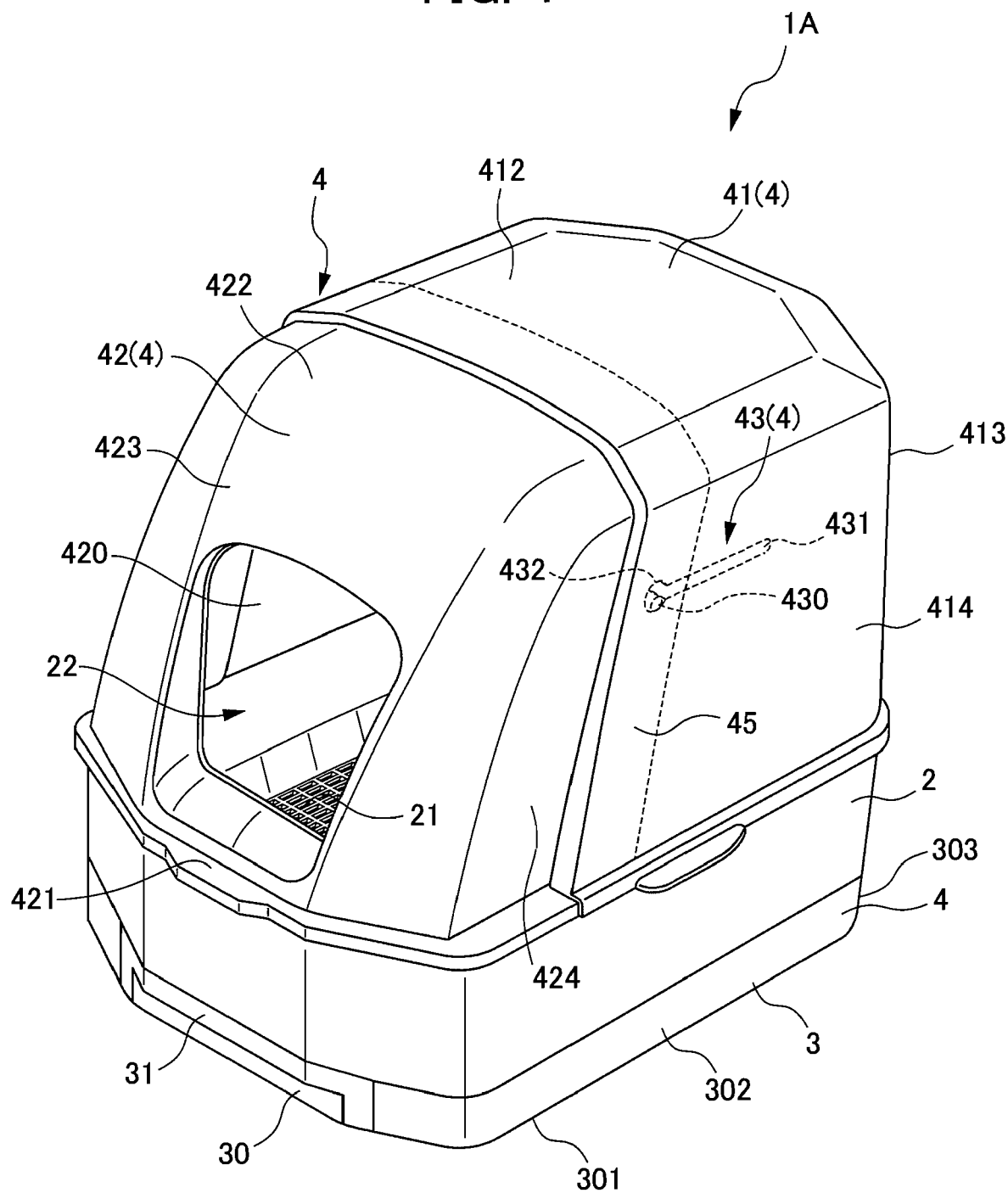
FIG. 4 is a perspective view of a closed state of the animal litter box according to a second embodiment.
Figure 5:
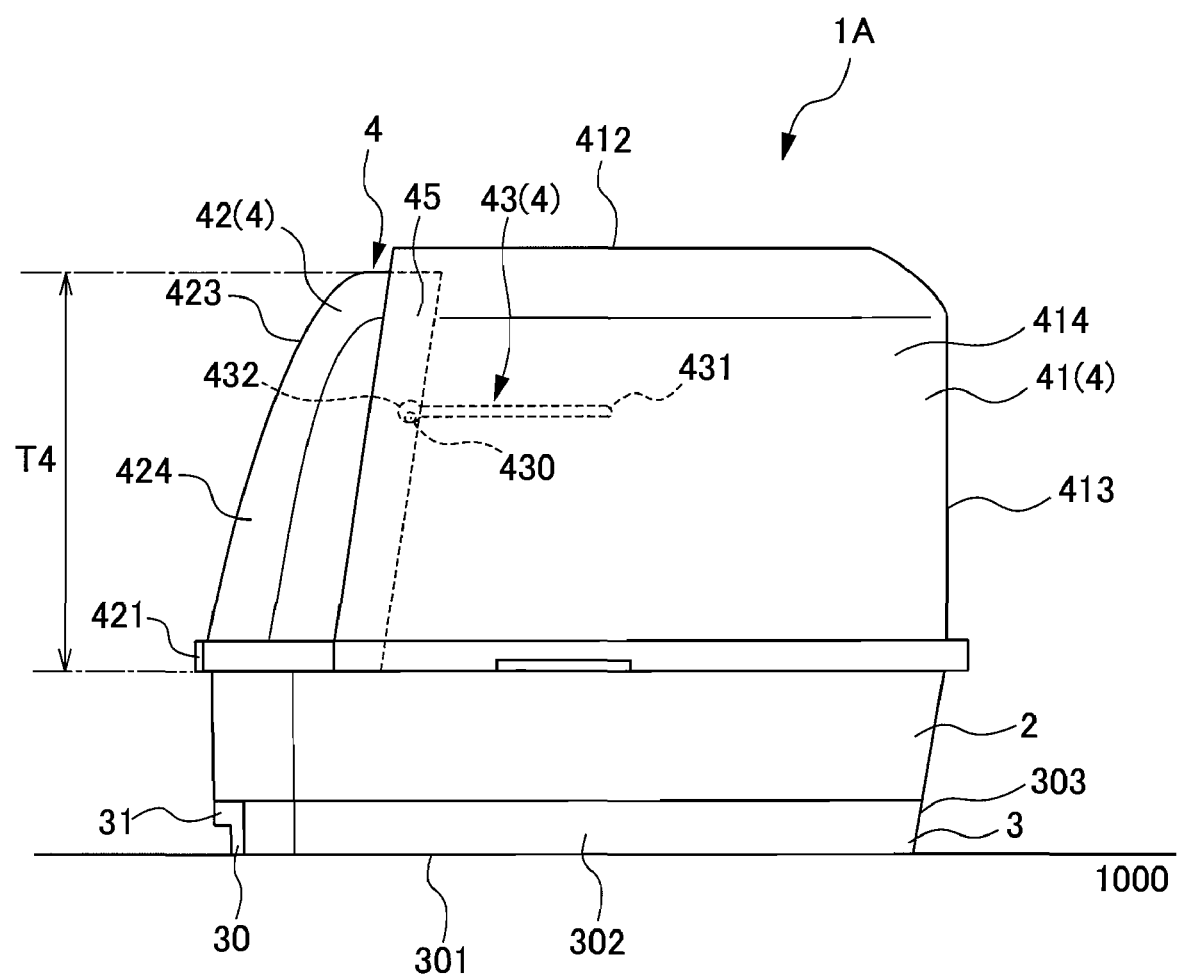
FIG. 5 is a side view of a closed state of the animal litter box according to a second embodiment.
Figure 6:
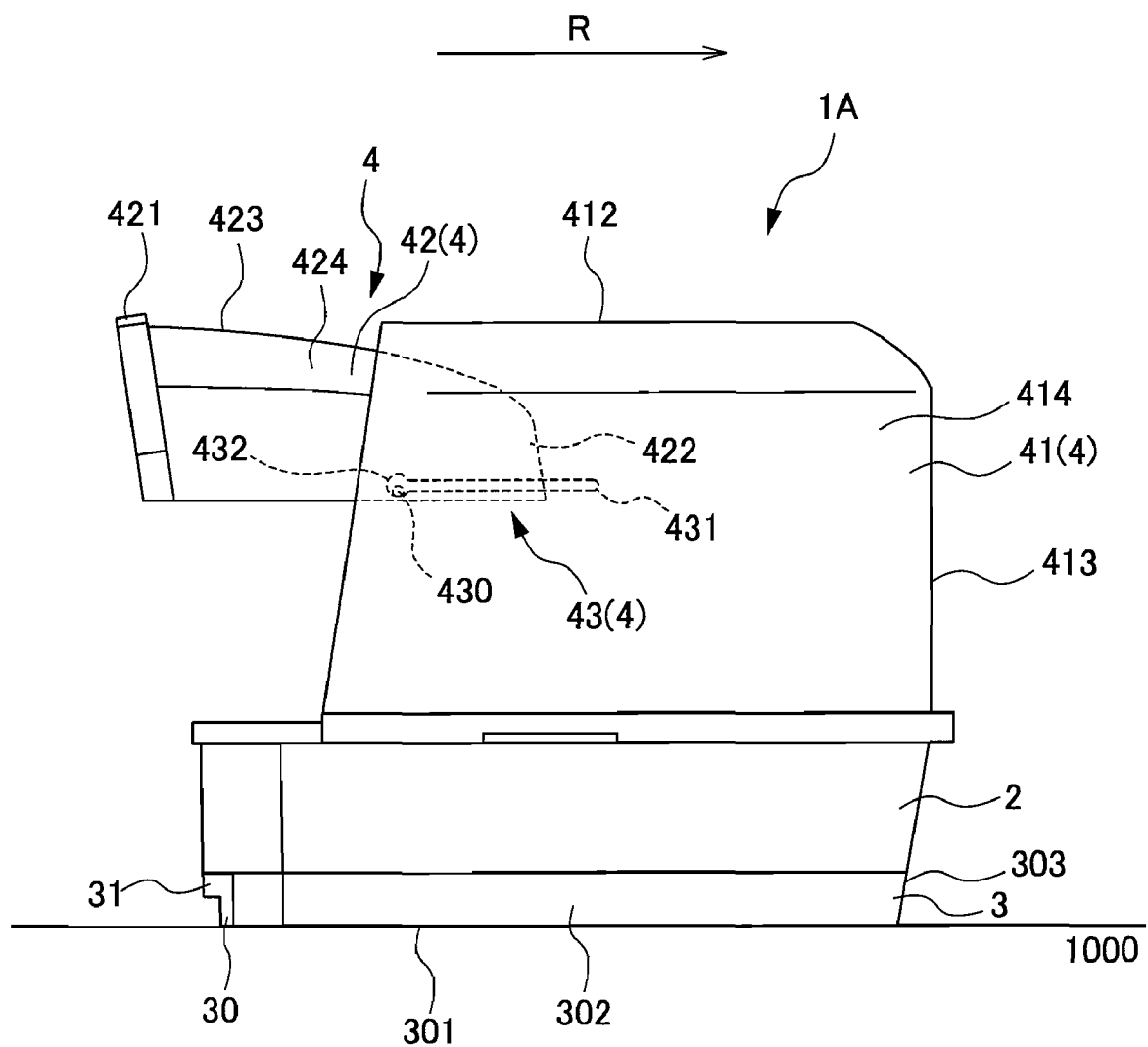
FIG. 6 is a side view showing a movable hood on the animal litter box according to the second embodiment, in a state in which it is rotated upward.
Figure 7:
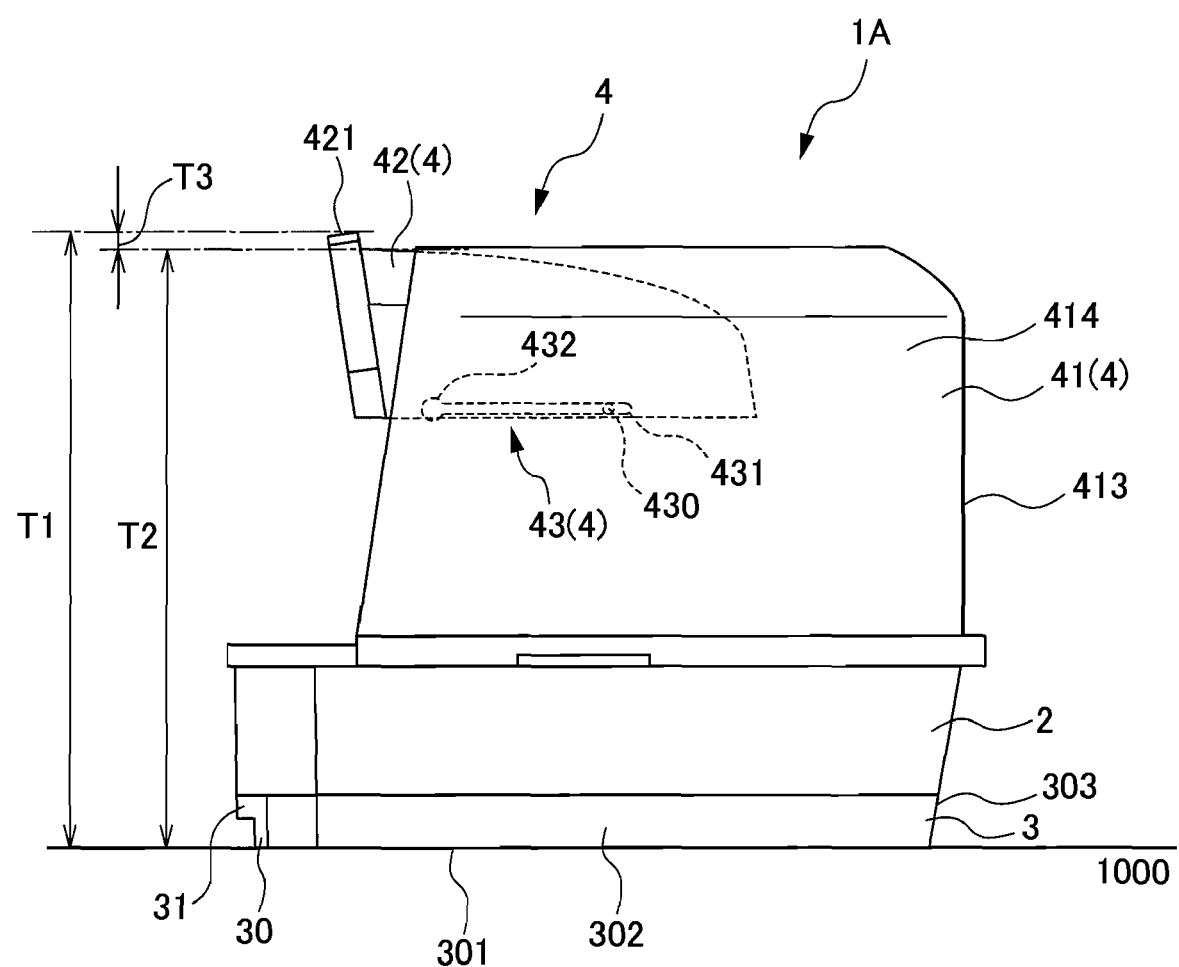
FIG. 7 is a side view of an opened state of the animal litter box according to the second embodiment.

FIG. 4 is a perspective view showing the movable hood on the animal litter box according to a second embodiment, in a closed state. FIG. 5 is a side view showing the movable hood on the animal litter box according to the second embodiment, in a closed state. FIG. 6 is a side view showing the movable hood on the animal litter box according to the second embodiment, in a state rotated upward. FIG. 7 is a side view showing the movable hood on the animal litter box according to the second embodiment, in an opened state. The following will now explain the animal litter box 1A according to a second embodiment with reference to FIGS. 4 to 7. Note that the portions that are not particularly explained in relation to the other embodiments are the same as the first embodiment. If the numbers applied in the drawings are the same as the first embodiment, the same numbers will also be applied to these embodiments.

In the second embodiment, a configuration of the linking portion 43 that moves the movable hood 42 to change it from a closed state to an opened state is different. The movable hood 42 is disposed further inside than the fixed hood 41. For that reason, the movable hood 42 is formed to dimensions one size smaller than the fixed hood 41 to be slidable inside the fixed hood 41. Also, the fixed hood 41 has a fixed hood top surface 412, a backside surface 413, and a pair of fixed hood longitudinal direction side surface 414, the shapes formed a substantial square.

As shown in FIGS. 4 and 5, the linking portions 43 of the second embodiment are disposed on the fixed hood top surface 412 side in the overlapping portions 45 in the walls of the movable hood 42 and the fixed hood 41. The linking portions 43 are disposed to mutually oppose each on the wall surface of one side and the wall surface on another side. The linking portions 43 are equipped with a pair of projecting shafts 430 provided on the movable hood 42 side, and a pair of cavity portions 432 provided in the fixed hood side that is engaged by the projecting shafts.

The pair of projecting shafts 430 is formed in the movable hood 42 to project from the outer surface of the side surface 424 of the longitudinal direction side surface side of the animal litter box 1B perpendicular to this side surface 424animal litter box. Guide channels 431 are formed in the inside surface side of the longitudinal direction side surface 414 of the fixed hood 41 to extend parallel to the fixed hood top surface 412 from the pair of cavities 432 to the backside of the fixed hood.

FIG. 6 shows the movable hood 42 of the animal litter box according to the second embodiment rotated upward. The movable hood 42 is rotated substantially 90 degrees in the cavities 432 around the projecting shafts 430 to move the hood side handle portion 421 upward of the fixed hood top surface 412. Also, the movable hood 42 moves in the direction of the arrow R, and is guided by the guide channels 431 horizontally and parallel to the fixed hood top surface 412 from the state shown in FIG. 6. FIG. 7 shows the opened state of the movable hood 42. The projecting shafts 430 of the movable hood 42 are stopped at the backside edge of the guide channels 431 and the movable hood 42 is housed inside fixed hood 41.

Note that it is also acceptable to reverse the relationship of the projecting shafts 430 of the movable hood 42 and the guide channels 431 disposed in the inner surface side of the fixed hood. In other words, guide channels 431 to be in a vertical direction when the the side surfaces 424 of the longitudinal direction side surface side of the animal litter box 1B in the movable hood 42 are in a closed state, and in a horizontal direction when that is in an opened state, and projecting shafts are formed on the inside surfaces of the fixed hood longitudinal direction side surfaces 414. Also, the projecting shafts 430 equipped on the fixed hood 41 engage the guide channels 431 equipped in the movable hood 42, so by moving the guide channels 431 with regard to the fixed projecting shafts 430, the movable hood 42 is housed inside the fixed hood 41. With this configuration, the same effects and actions are attained as when the guide channels 431 are formed in the fixed hood 41, and the projecting shafts 430 are formed on the movable hood 42.

As shown in FIG. 7, only the portion of the hood side handle portion 421 of the movable hood 42 is substantially the highest of the animal litter box 1 when the movable hood 42 is in an opened state. Also, when the movable hood 42 changes from a closed state to an opened state, the protruding height T3 subtracting the highest portion T2 of the animal litter box 1 when the movable hood is closed from the highest portion T1 of the track of movement of the movable hood 42, is less than the height T4 of the movable hood 42 when the movable hood 42 is closed. According to this embodiment, because the movable hood 42 is housed in the fixed hood 41, it is possible to attain a lower height when open than the first embodiment. Therefore, it is possible to setup the animal litter box 1A according to this embodiment even where space is limited in the height direction. Also, to clean the inside of the animal litter box 1A, the hood side handle portion 421 is gripped and lifted to move the movable hood 42 to the backside thereby exposing the front side of the bottom portion 21 of the excreta container 2 filled with litter so it is easy to clean the entire inner space of the animal litter box 1A.

3. Third Embodiment

Figure 8:
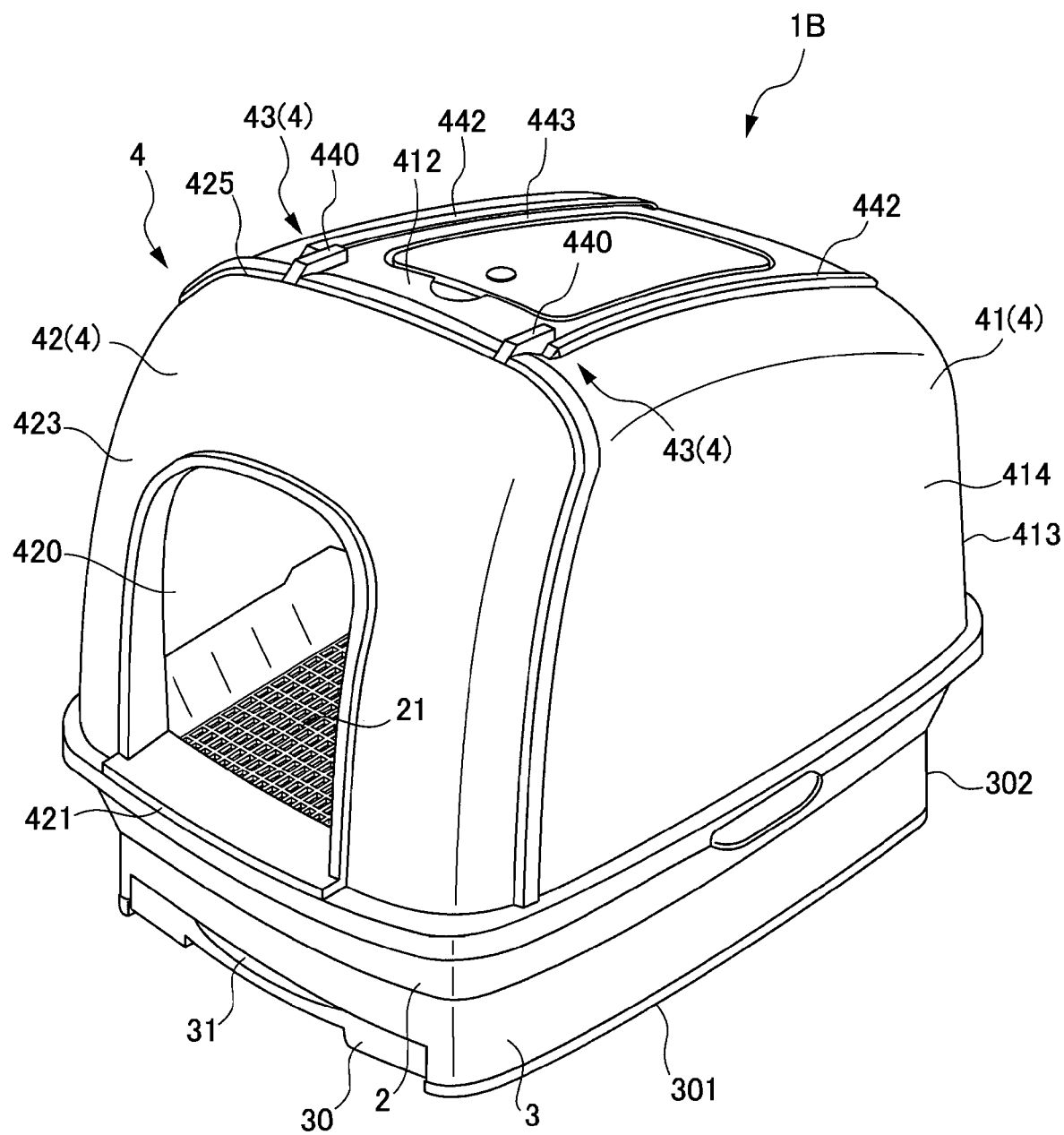
FIG. 8 is a perspective view of a closed state of the animal litter box according to a third embodiment.
Figure 9:
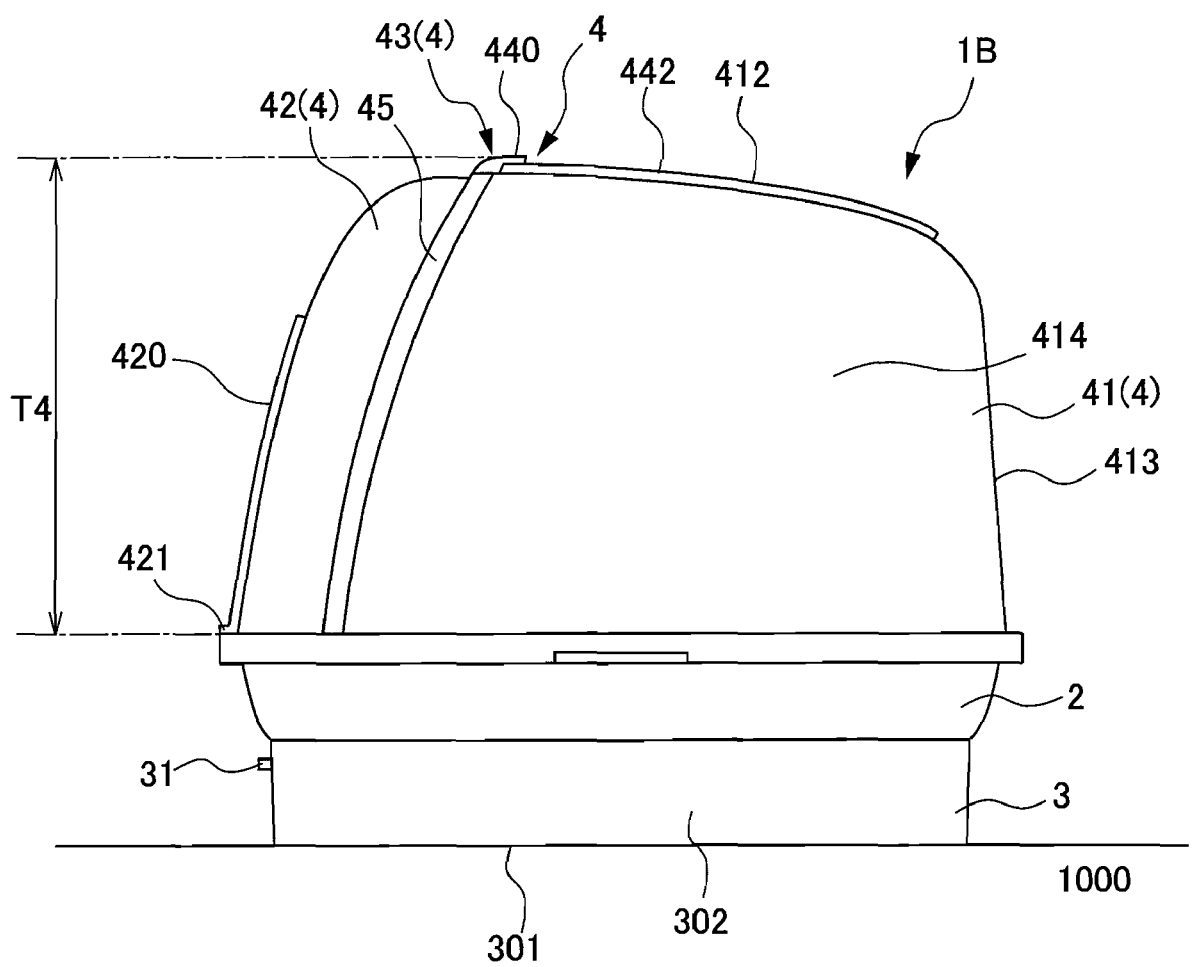
FIG. 9 is a side view of a closed state of the animal litter box according to the third embodiment.
Figure 10:
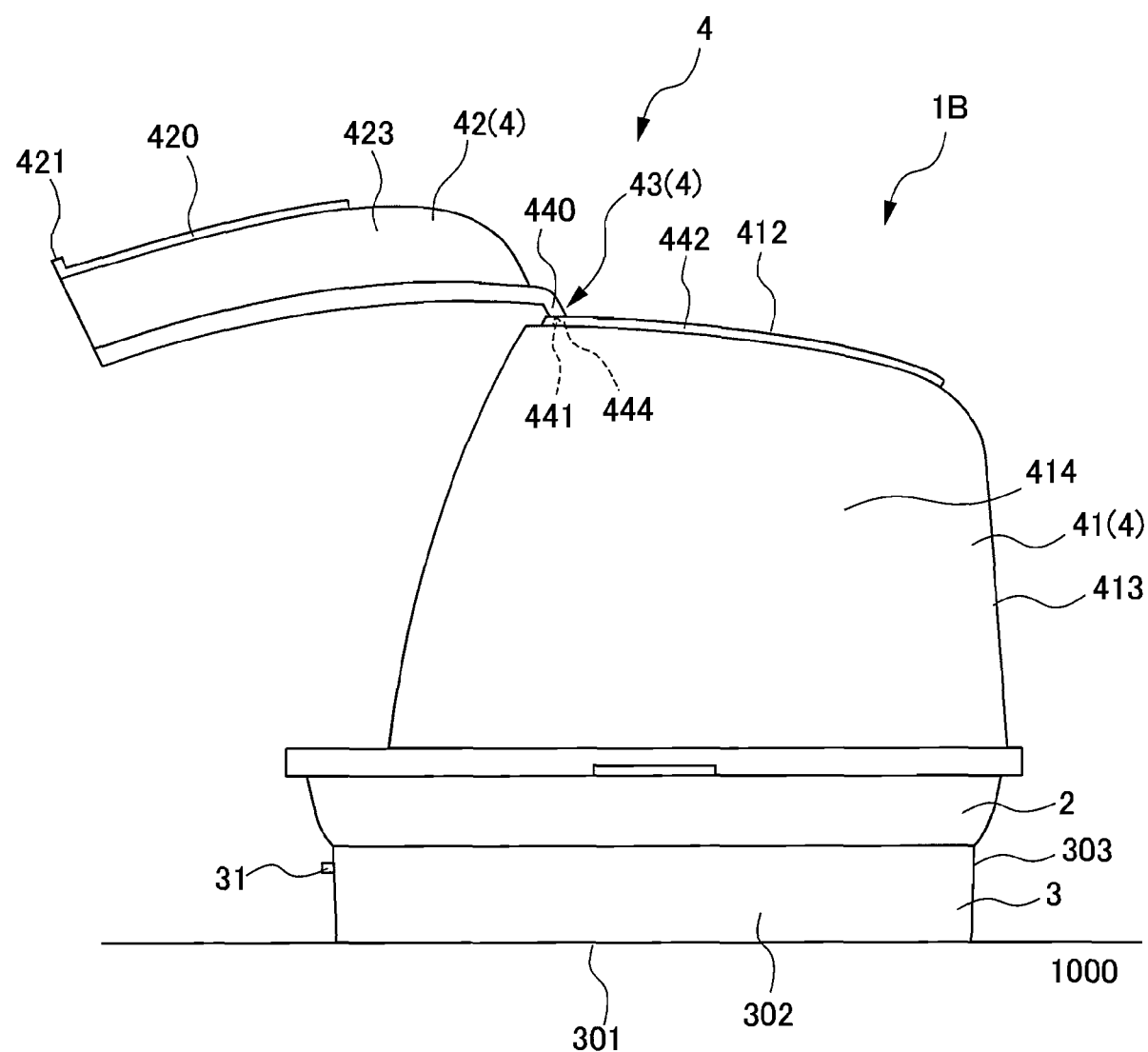
FIG. 10 is a side view showing a movable hood on the animal litter box according to the third embodiment, in a state in which it is rotated upward.
Figure 11:
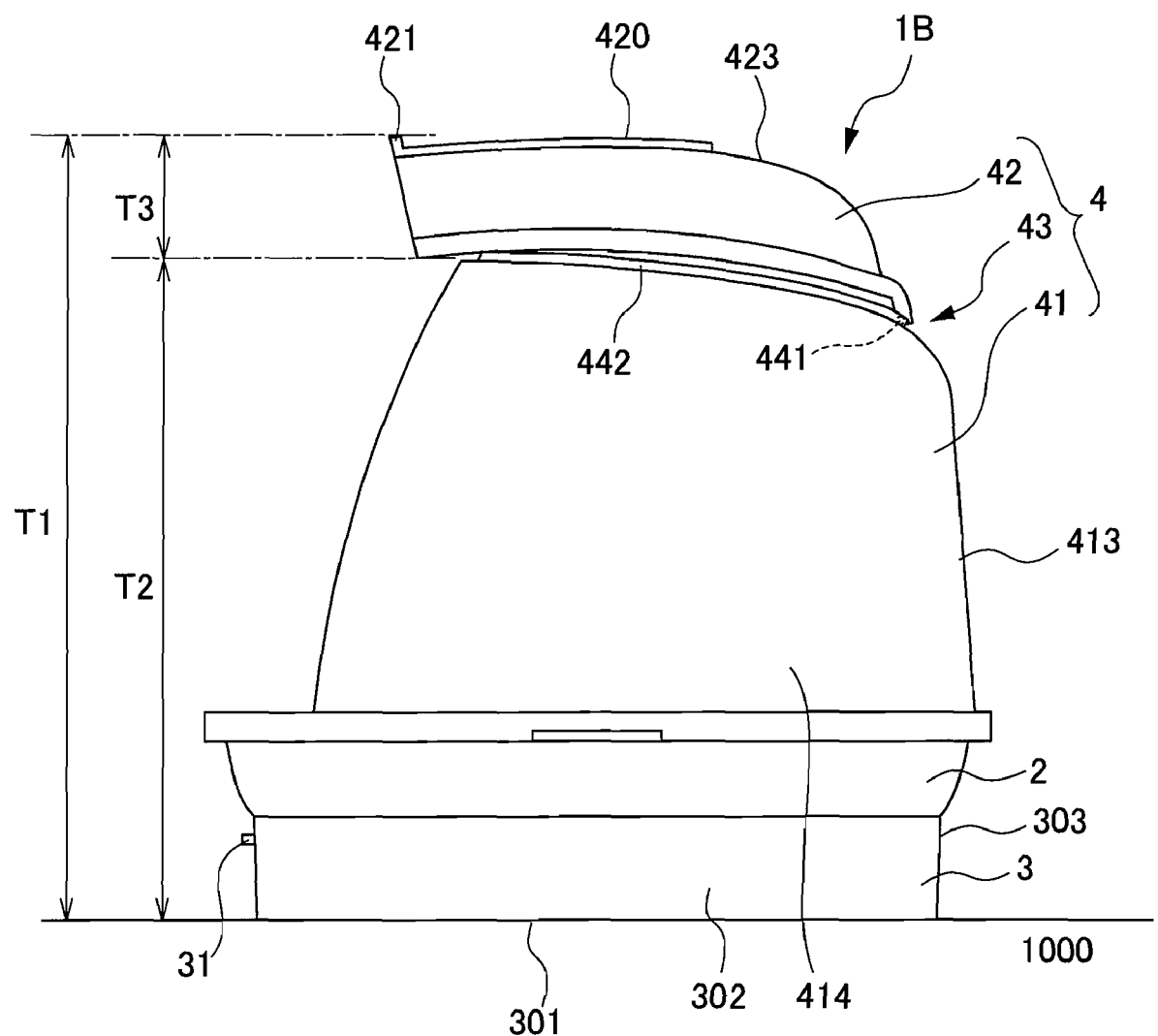
FIG. 11 is a side view of an opened state of the animal litter box according to the third embodiment.

FIG. 8 is a perspective view showing the movable hood on the animal litter box according to a third embodiment, in a closed state. FIG. 9 is a side view showing the movable hood on the animal litter box according to the third embodiment, in a closed state. FIG. 10 is a side view showing the movable hood on the animal litter box according to the third embodiment, in a state rotated upward. FIG. 11 is a side view showing the hood on the animal litter box according to the third embodiment, in an opened state. The following will now explain the animal litter box 1B according to a third embodiment with reference to FIGS. 8 to 11. In the third embodiment, a configuration of the linking portion 43 that moves the movable hood 42 to change it from a closed state to an open state is different.

The fixed hood 41 of the third embodiment is disposed to cover from the backside of the excreta container 2 in the longitudinal direction of the animal litter box 1B to over half of the excreta container 2. When closed, the movable hood 42 is disposed in a cover shape at the front side of the fixed hood 41. In the opened state, the movable hood 42 is set outside of the top surface 412 of the fixed hood 41.

In the third embodiment, as shown in FIGS. 8 and 9, the movable hood 42 has a pair of support portions 440 that extends further to the backside from the top edge 425 of the backside of the movable hood 42 which is a part of the overlapping portion 45, extending in a direction perpendicular to the front side 423 of the movable hood 42. Also, a pair of projecting shafts 441 is formed at the outside in the width direction of the support portions 440 to extend in a direction parallel to the front surface 423 of the movable hood 42.

A pair of long, convex guide portions 442 is formed on the fixed hood top surface 412 to extend from the front side to the backside along the longitudinal direction of the animal litter box 1B. At the inner side surface in the width direction of the pair of long convex guide portions 442, a pair of cavity portions 444 is formed, and guide portions 443 are continuously formed to extend from the cavity portions 444 to the backside along the longitudinal direction of the animal litter box 1B.

In the third embodiment, the linking portions 43 are composed of the projecting shafts 441 and the guide portions 442.

FIG. 10 shows the movable hood 42 of the animal litter box according to the third embodiment rotated upward. The hood side handle portion 421 of the movable hood 42 is moved upward rotating substantially 90 degrees with regard to the opening surface when in a closed state. In the state shown in FIG. 10, the projecting shafts 441 of the movable hood 42 mate with the guide channels 443 equipped continuously on the cavity portions 444 of the fixed hood 41 and move to the backside guided by the guide channels 443. As shown in FIG. 11, when the projecting shafts 441 move the backside edge of the guide channels 443, the movable hood 42 is set outside of the top surface of the fixed hood 41. This state is the opened state.

According to the third embodiment, because the movable hood 42 is set above the top surface 422 of the fixed hood 41, the opening for cleaning the inside of the animal litter box 1B is wider compared to the second embodiment. Also, because there are no fasteners of the linking portions on the inside of the fixed hood 41 as in the first embodiment, cleaning is even easier.

4. Fourth Embodiment

Figure 12:
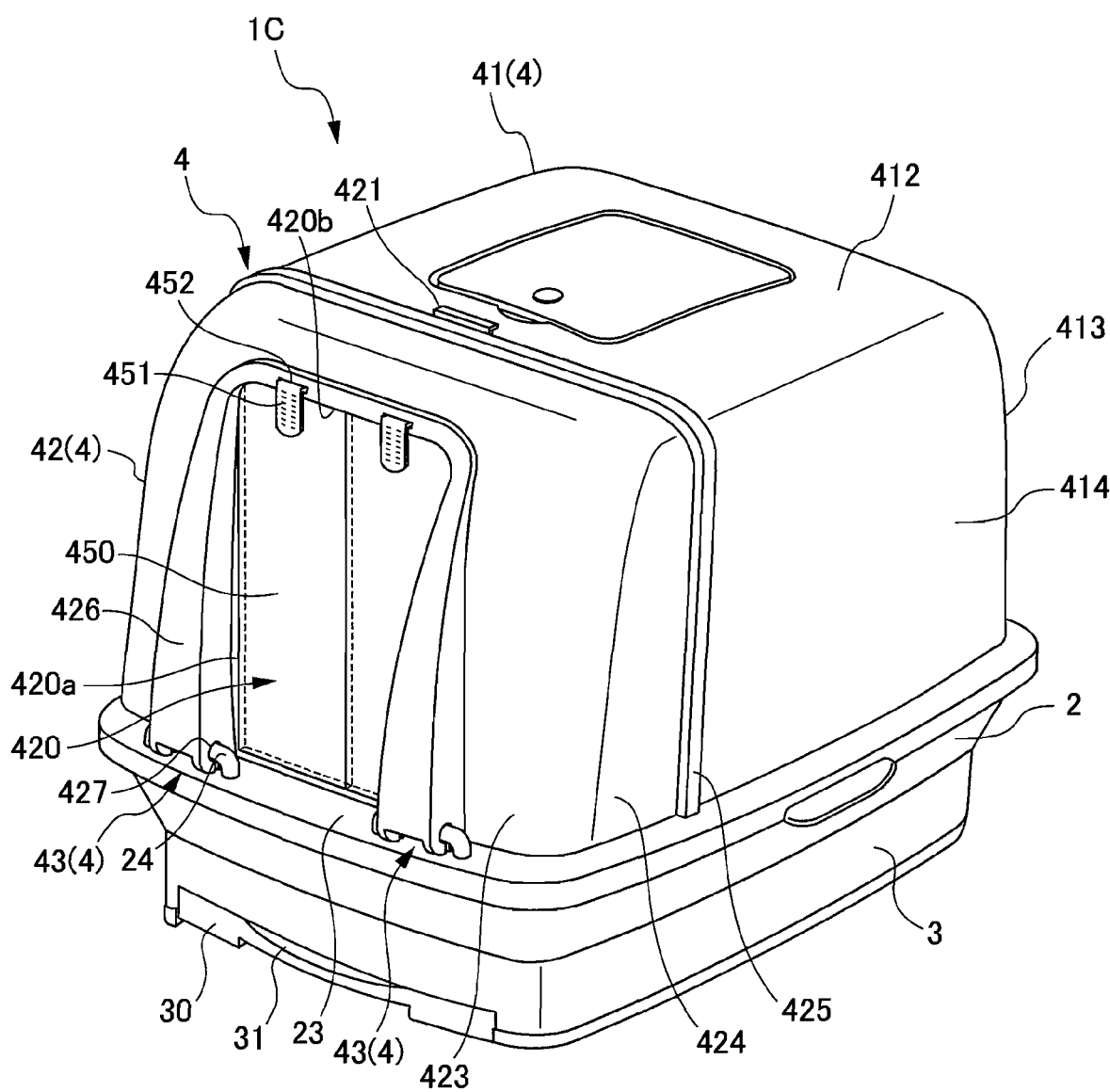
FIG. 12 is a perspective view of a closed state of the animal litter box according to a fourth embodiment.
Figure 13:
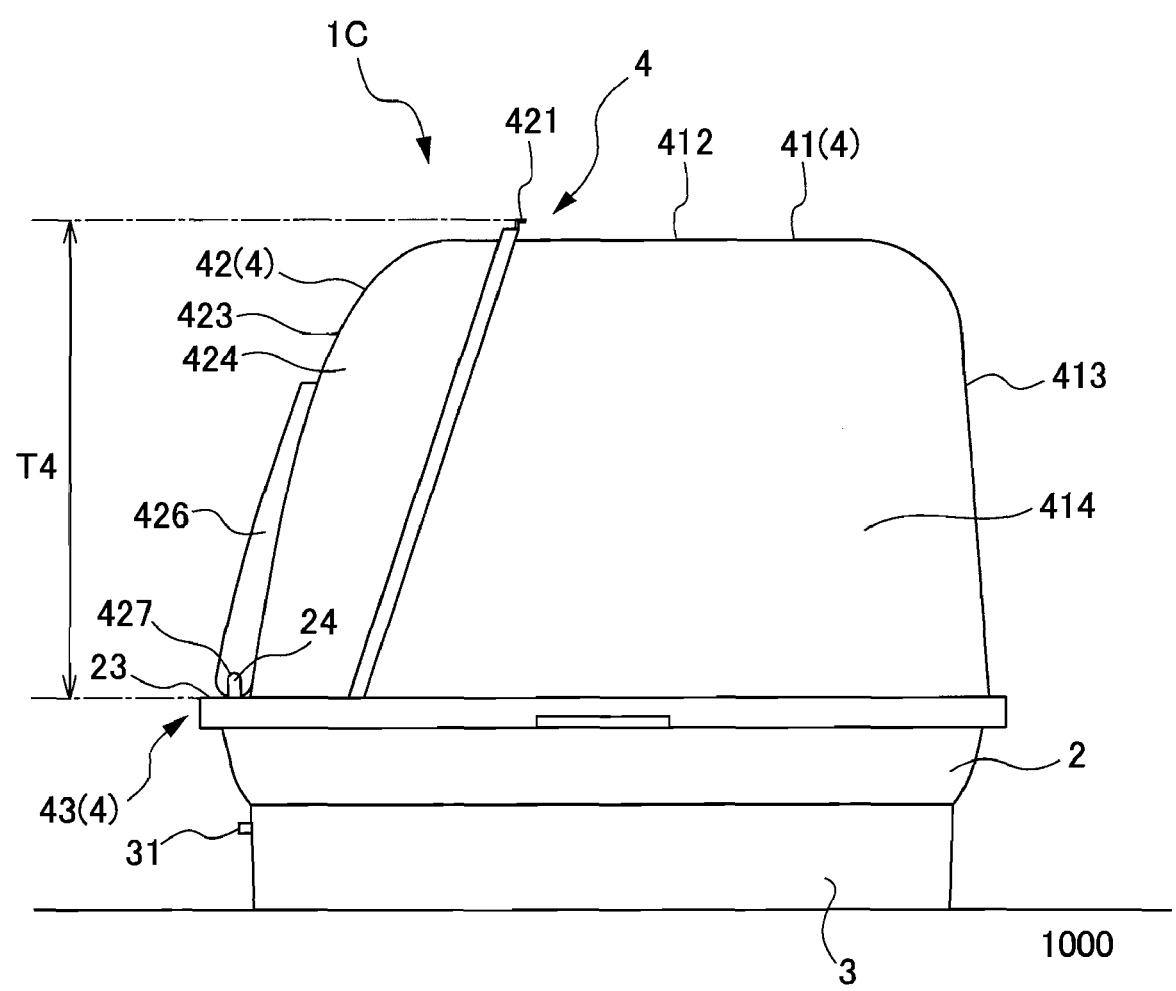
FIG. 13 is a side view of a closed state of the animal litter box according to the fourth embodiment.

FIG. 12 is a perspective view of the animal litter box according to a fourth embodiment. FIG. 13 is a side view of the animal litter box according to the fourth embodiment in a closed state. FIG. 14 is a side view showing the movable hood on the animal litter box according to the fourth embodiment, in a state rotated downward. The following will now explain the animal litter box 1C according to a fourth embodiment with reference to FIGS. 12 to 14. In the fourth embodiment, a configuration of the linking portion 43 that moves the movable hood 42 to change it from a closed state to an open state is different.

In the same way as the animal litter box 1B of the third embodiment, the fixed hood 41 of the animal litter box 1C according to the fourth embodiment is disposed to cover from the backside of the excreta container 2 in the longitudinal direction over half of the excreta container 2. When closed, the movable hood 42 is disposed in a cover shape at the front side of the fixed hood 41. When opened, the movable hood 42 opens by laying over to the front side of the animal litter box.

As shown in FIG. 12, the movable hood 42 has a longitudinal direction edge 420a of the movable hood opening 420 and a hem 426 that projects to the front direction continuously to a top side edge 420b.

The excreta container 2 has a front top portion 23 horizontally disposed parallel to the bottom portion 21 from the edge of the front side of the opening 22 of the excreta container 2. The front side top portion 23 disposed at the top edge of the front side of the excreta container 2 is disposed to be substantially perpendicular to the hem 426. The portion of the hem 426 that touches the front side top portion 23 is a bottom side portion of the longitudinal direction side edge of the hem 426. The linking portions 43 are disposed in the bottom side portions.

The linking portions 43 have a pair of linking shafts 24 formed in the front side top portion 23, and a pair of bearings 427 formed near both side edges of the opening 420 at a lower edge of the front surface 423 of the movable hood, in the hem 426 of the movable hood 42. The bearings 427 support the linking shafts 24 and link the movable hood 42 to the excreta container 2. The bearings 427 rotate around the linking shafts 24 as shaft axes to rotate the movable hood 42.

Also, in the fourth embodiment, a removable suspension type door 450 is provided at the opening 420 of the movable hood. Therefore, the hem 426 on the movable hood opening 420 has a suspended-type door 450, pins 451 disposed at an edge at the top surface side 420b of the opening 420 to lock the suspended-type door 450, and locking portions 452 to position the pins at the hem 426. The hood side handle portion 421 is disposed on a top surface side of the movable hood backside edge 425 where the movable hood 42 and the fixed hood 41 touch.

FIG. 13 is a side view of the animal litter box 1C shown in FIG. 12, in a closed state. The movable hood 42 as shown in FIG. 14 opens to the front side rotating the linking portions 43 by the hood side handle portion 421 laying over to the front side. This state is the opened state.

In the fourth embodiment, when the movable hood 42 changes from a closed state to an opened state by being opened to the front side, the protruding height T3 that is a difference of the highest portion T1 of the track of the movement of the movable hood 42 and the highest portion T2 of the animal litter box 1 when closed, is smaller than the height T4 of the movable hood 42 when the movable hood 42 is closed. (See FIG. 14) Therefore, it is possible to setup the animal litter box 1C according to this embodiment even at a space that is limited in the height direction.

Also, to clean the contents of the animal litter box 1C, the front side of the bottom portion 21 of the excreta container 2 filled with litter is exposed simply by gripping and lifting the hood side handle portion 421 and move the movable hood 42 to the front. For that reason, it is possible to easily clean the entire inner space of the animal litter box 1C. Also, when opened, the backside of the movable hood 42 is exposed at the front, so it is also easy to clean the backside of the movable hood 42.

Furthermore, in the fourth embodiment, a suspension type door 450 is equipped. For that reason, when the animal excretes inside and stirs the litter, it is not possible for the litter to be scattered from the movable hood opening 420. Therefore, when the animal litter box 1C is setup, it is possible to keep the space around the animal litter box 1C cleaner.

The animal litter box according to this embodiment is not limit thereto, and variations may be made without departing from the scope of the invention. For example, in the first to the fourth embodiments, it is acceptable to dispose an openable top window in the top surface of the movable hood 42 or the fixed hood to access the inside space from the top surface. In the first to the fourth embodiments, the excreta container 2 was equipped with the bottom portion 21 having liquid-permeability, and therebelow a lower container 3 was disposed, but it is also acceptable that the excreta container 2 is not liquid permeable.

The animal litter box of the present invention can be used as a toilet for animals such as cats, dogs or rabbits and the like kept as pets, and particularly used preferably used as a toilet for cats kept indoors.

What is claimed is:
1. An animal litter box comprising:
an excreta container comprising a liquid-permeable bottom portion and an open top portion;
a lower container positioned below the excreta container, comprising a drawable tray that collects liquid that passed through the bottom portion and an insertion inlet to insert the draw tray; and
a hood disposed to cover an opening of the excreta container, wherein
the hood comprises: a fixed hood disposed at a backside that is one end of the excreta container; a movable hood disposed at a front side that is an opposite side to the backside of the excreta container, and a pair of linking portions that rotatably links the movable hood;
the movable hood has a substantially square shape including a flat top face, a flat front face, and opposing substantially square side faces, and rotates outside the fixed hood, and
the front face has a planar open portion provided thereon;
the insertion inlet is disposed at the front side;
when the movable hood is open, the front side at the opening, and a bottom portion is also exposed; and
when the movable hood is moved between a closed position and an opened position, a protruding height which is the difference of a height of the highest position that the movable hood reaches as it moves between the open and closed positions and a highest portion of the animal litter box when the movable hood is in the closed position is smaller than a height of the movable hood when the movable hood is in the closed position.

2. The animal litter box according to claim 1 wherein the maximum protruding height is not greater than 250 mm.

3. The animal litter box according to claim 1, wherein a hood side handle portion is formed in the movable hood to open and close the movable hood, and a tray side handle portion is formed in the draw tray to draw the draw tray; and when the movable hood is closed, the tray side handle portion and the hood side handle portion are mutually adjacent at the front side.

4. The animal litter box according to claim 1, wherein the movable hood and the fixed hood have a portion that overlaps when the movable hood is in the closed state and the pair of linking portions links the movable hood to the fixed hood at a portion of the overlapping portion; and when the movable hood is in the open state, the movable hood is positioned to cover the outside of the fixed hood.

5. The animal litter box according to claim 4, wherein the pair of linking portions is equipped to be mutually opposed near edges of the lower container side at the overlapping portions.

* * * * *